United States Patent
Harris et al.

(10) Patent No.: US 10,059,825 B2
(45) Date of Patent: Aug. 28, 2018

(54) SILICA TREATING OF FUNCTIONALIZED RESINS IN TIRES

(71) Applicant: ExxonMobil Chemical Patents Inc., Baytown, TX (US)

(72) Inventors: David T. Harris, Houston, TX (US); Ian C. Stewart, Houston, TX (US); Olivier J. Georjon, Uccle (BE); Edward J. Blok, Huffman, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 0 days.

(21) Appl. No.: 15/118,660

(22) PCT Filed: Mar. 6, 2015

(86) PCT No.: PCT/US2015/019190
§ 371 (c)(1),
(2) Date: Aug. 12, 2016

(87) PCT Pub. No.: WO2015/153057
PCT Pub. Date: Oct. 8, 2015

(65) Prior Publication Data
US 2017/0066898 A1 Mar. 9, 2017

Related U.S. Application Data

(60) Provisional application No. 61/972,964, filed on Mar. 31, 2014.

(51) Int. Cl.

| | |
|---|---|
| *C08K 3/36* | (2006.01) |
| *B60C 1/00* | (2006.01) |
| *C08G 83/00* | (2006.01) |
| *C08F 8/42* | (2006.01) |
| *C09C 1/30* | (2006.01) |
| *C08K 9/06* | (2006.01) |
| *C08K 9/08* | (2006.01) |
| *C08L 9/06* | (2006.01) |
| *C08G 61/02* | (2006.01) |
| *C08K 9/10* | (2006.01) |
| *C08K 3/22* | (2006.01) |

(52) U.S. Cl.
CPC .............. *C08K 3/36* (2013.01); *B60C 1/0016* (2013.01); *C08F 8/42* (2013.01); *C08G 61/02* (2013.01); *C08G 83/001* (2013.01); *C08K 9/06* (2013.01); *C08K 9/08* (2013.01); *C08K 9/10* (2013.01); *C08L 9/06* (2013.01); *C09C 1/309* (2013.01); *C09C 1/3072* (2013.01); *C09C 1/3081* (2013.01); *C08F 2810/40* (2013.01); *C08G 2261/3325* (2013.01); *C08G 2261/726* (2013.01); *C08K 2003/2296* (2013.01); *Y02T 10/862* (2013.01)

(58) Field of Classification Search
CPC .... C08K 3/36; C08K 9/06; C08K 9/08; B60C 1/0016; C08G 83/001; C08G 61/02; C08F 8/42; C08F 2810/40; C09C 1/3072; C09C 1/3081; C09C 1/309; C08L 9/06
USPC ........................................................ 524/518
See application file for complete search history.

(56) References Cited

U.S. PATENT DOCUMENTS

| | | | |
|---|---|---|---|
| 5,194,489 A | 3/1993 | Frances et al. | |
| 6,300,449 B2 | 10/2001 | Wideman et al. | |
| 7,491,767 B2 * | 2/2009 | Durel | B60C 1/0016 152/209.1 |
| 8,735,500 B2 * | 5/2014 | Barbee | C08F 232/06 525/192 |
| 9,376,566 B2 * | 6/2016 | Blok | B29B 9/065 |
| 2010/0113703 A1 | 5/2010 | Houjo et al. | |
| 2013/0211027 A1 * | 8/2013 | Barbee | C08F 232/06 526/283 |
| 2014/0144573 A1 * | 5/2014 | Blok | B29B 9/065 156/110.1 |

FOREIGN PATENT DOCUMENTS

| | | | |
|---|---|---|---|
| EP | 0 260 103 | 3/1988 | |
| EP | 0260103 A1 * | 3/1988 | ............... C08F 8/42 |
| EP | 2 423 239 | 2/2012 | |
| FR | 2384816 | 10/1978 | |
| FR | 2384816 A1 * | 10/1978 | ............. C08J 3/203 |
| JP | 2000336152 | 12/2000 | |
| WO | 91/08240 | 6/1991 | |
| WO | WO 9108240 A1 * | 6/1991 | ............... C08F 8/42 |
| WO | 2010/125123 | 11/2010 | |
| WO | 2010/125124 | 11/2010 | |
| WO | 2012/050667 | 4/2012 | |
| WO | WO 2012050667 A1 * | 4/2012 | ............. C08F 10/14 |
| WO | 2014/047482 A | 3/2014 | |
| WO | 2015/084436 | 6/2015 | |

* cited by examiner

*Primary Examiner* — Michael M Bernshteyn
(74) *Attorney, Agent, or Firm* — Priya Prasad

(57) ABSTRACT

This invention relates to a process for the preparation of a silica-treated functionalized resin composition comprising the steps of reacting a polymer backbone with a hydrosilylation agent to produce a silane-functionalized resin composition, wherein the polymer backbone is selected from at least one of dicyclopentadiene (DCPD)-based polymers, cyclopentadiene (CPD)-based polymers, DCPD-styrene copolymers, $C_5$ homopolymers and copolymer resins, $C_5$-styrene copolymer resins, terpene homopolymer or copolymer resins, pinene homopolymer or copolymer resins, $C_9$ homopolymers and copolymer resins, $C_5/C_9$ copolymer resins, alpha-methylstyrene homopolymer or copolymer resins, and combinations thereof; and mixing the silane-functionalized resin composition with a silica to produce a silica-treated functionalized resin composition.

15 Claims, No Drawings

SILICA TREATING OF FUNCTIONALIZED RESINS IN TIRES

CROSS REFERENCE TO RELATED APPLICATION

This application is a National Stage Application of International Application No. PCT/US2015/019190, filed Mar. 6, 2015, and claims priority to and the benefit of U.S. Provisional Patent Application No. 61/972,964, filed Mar. 31, 2014, the disclosures of which incorporated herein by reference in their entireties.

FIELD OF THE INVENTION

This invention relates to treating a functionalized resin molecule with silica for use in tire compound applications.

BACKGROUND

Treads of high performance tires are expected to have outstanding traction and handling properties. Generally, tire treads are compounded with high filler loading and resins to achieve these desired properties.

For passenger tires, miscible resins are typically used in tread compound formulations in order to increase traction characteristics. Although these resins increase overall traction, tread compounds formulated with these miscible resins tend to suffer from reduced traction and handling at high speeds or at high internal tire temperatures generated during hard driving.

The problems observed in passenger tires at high speeds and temperatures have been solved by adding high softening point immiscible resins and resin blends for use in race car tires. For instance, it has been observed that using resin packages with high G' (storage modulus) values at high temperatures along with high tangent delta (ratio of loss modulus to storage modulus) values improve tire performance at high speeds and temperatures. However, since adding immiscible resins reduces the life of the tire tread, using immiscible resins for high performance passenger tires is not a viable option because of the increased stability and lifetime requirements of passenger tires versus those of race car tires.

Patent Application No. PCT/US2014/050475 discloses DCPD-based functionalized resins prepared via metathesis chemistry. There still remains a need for a resin that demonstrates improved durability along with improved traction and handling in a cost effective manner.

SUMMARY OF THE INVENTION

The foregoing and/or other challenges are addressed by the methods and products disclosed herein.

This invention relates to a process for the preparation of a silica-treated functionalized resin composition comprising the steps of reacting a polymer backbone with a hydrosilylation agent to produce a silane-functionalized resin composition, wherein the polymer backbone is selected from at least one of dicyclopentadiene (DCPD)-based polymers, cyclopentadiene (CPD)-based polymers, DCPD-styrene copolymers, $C_5$ homopolymers and copolymer resins, $C_5$-styrene copolymer resins, terpene homopolymer or copolymer resins, $C_9$ homopolymers and copolymer resins, $C_5/C_9$ copolymer resins, alpha-methylstyrene homopolymer or copolymer resins, and combinations thereof; and mixing the silane-functionalized resin composition with a silica to produce a silica-treated functionalized resin composition.

DETAILED DESCRIPTION

Various specific embodiments of the invention will now be described, including preferred embodiments and definitions that are adopted herein for purposes of understanding the claimed invention. While the illustrative embodiments have been described with particularity, it will be understood that various other modifications will be apparent to and can be readily made by those skilled in the art without departing from the spirit and scope of the invention. For determining infringement, the scope of the "invention" will refer to any one or more of the appended claims, including their equivalents and elements or limitations that are equivalent to those that are recited.

The inventors have discovered that preparing a functionalized resin molecule, via the process of hydrosilylation, and then treating it with silica results in advantageous properties for the resin for use in elastomeric compounds of high performance tire applications.

The term "phr" means parts per hundred parts of rubber, and is a measure common in the art wherein components of a composition are measured relative to the total of all of the elastomer (rubber) components. The total phr or parts for all rubber components, whether one, two, three, or more different rubber components when present in a given recipe, is always defined as 100 phr. All other non-rubber components are ratioed against the 100 parts of rubber and are expressed in phr.

The term "silane" means any silicon analog of a substituted or unsubstituted alkane hydrocarbon. The term "silane structure" refers to any compound, moiety or group containing a tetravalent silicon atom. The term "interpolymer" means any polymer or oligomer having a number average molecular weight of 500 or more prepared by the polymerization or oligomerization of at least two different monomers, including copolymers, terpolymers, tetrapolymers, etc. As used herein, reference to monomers in an interpolymer is understood to refer to the as-polymerized and/or as-derivatized units derived from that monomer. The terms polymer and interpolymer are used broadly herein and in the claims to encompass higher oligomers having a number average molecular weight (Mn) equal to or greater than 500, as well as compounds that meet the molecular weight requirements for polymers according to classic ASTM definitions.

All resin component percentages listed herein are weight percentages, unless otherwise noted. "Substantially free" of a particular component in reference to a composition is defined to mean that the particular component comprises less than 0.5 wt % in the composition, or more preferably less than 0.25 wt % of the component in the composition, or most preferably less than 0.1 wt % of the component in the composition.

The term "elastomer," as used herein, refers to any polymer or combination of polymers consistent with the ASTM D1566 definition, incorporated herein by reference. As used herein, the term "elastomer" may be used interchangeably with the term "rubber."

Functionalized Resin

The functionalized resin molecules of the present invention are prepared via hydrosilylation (also known as hydrosilation) methods known in the art. International Patent Application No. PCT/US2013/060993 discloses the hydrosilylation of vinyl-terminated macromonomers with polyalkylhydrosiloxane to yield highly branched materials or linear materials by further modification. The composition and processes disclosed in International Patent Application No. PCT/US2013/060993 is incorporated herein by reference.

Polymer Backbone

The phrase "polymer backbone" includes substituted or unsubstituted units derived from cyclopentadiene homopolymer or copolymer resins (referred to as CPD), dicyclopentadiene homopolymer or copolymer resins (referred to as DCPD or (D)CPD), terpene homopolymer or copolymer resins, pinene homopolymer or copolymer resins, $C_5$ fraction homopolymer or copolymer resins, $C_9$ fraction homopolymer or copolymer resins, alpha-methylstyrene homopolymer or copolymer resins, and combinations thereof. The polymer backbone may further include units derived from (D)CPD/vinylaromatic copolymer resins, (D)CPD/terpene copolymer resins, terpene/phenol copolymer resins, (D)CPD/pinene copolymer resins, pinen/phenol copolymer resins, (D)CPD/$C_5$ fraction copolymer resins, (D)CPD/$C_9$ fraction copolymer resins, terpene/vinylaromatic copolymer resins, terpene/phenol copolymer resins, pinene/vinylaromatic copolymer resins, pinene/phenol resins, $C_5$ fraction/vinylaromatic copolymer resins, and combinations thereof. The term "resin molecule" or "resin" as used herein is interchangeable with the phrase "polymer backbone."

The phrase "units derived from dicyclopentadiene" includes units derived from substituted DCPD such as methyl DCPD or dimethyl DCPD.

Preferably, the polymer comprising units derived from dicyclopentadiene (also referred to as the "DCPD polymer") have an Mw within the range from 150 to 10,000 g/mol (as determined by GPC), more preferably from 200 to 5,000 g/mol, most preferably from 300 to 1000 g/mol. While reference is made to a DCPD polymer, any polymer backbone comprised of units mentioned herein is suitable for the present invention.

Preferably, the polymer backbone comprises up to 100 mol % units derived from dicyclopentadiene, more preferably within the range from 5 to 90 mol % units derived from DCPD, most preferably from 5 to 70 mol % units derived from DCPD.

Preferably, the polymer backbone comprises up to 15% piperylene components, up to 15% isoprene components, up to 15% amylene components, up to 20% indene components, within the range from 60% to 100% cyclic components, and up to 20% styrenic components by weight of the monomers in the monomer mix.

Cyclic components are generally a distillate cut or synthetic mixture of $C_5$ and $C_6$ to $C_{15}$ cyclic olefins, diolefins, and dimers, co-dimers and trimers, etc., from a distillate cut. Cyclics include, but are not limited to, cyclopentene, cyclopentadiene, DCPD, cyclohexene, 1,3-cyclyohexadiene, and 1,4-cyclohexadiene. A preferred cyclic is cyclopentadiene. The DCPD may be in either the endo or exo form. The cyclics may or may not be substituted. Preferred substituted cyclics include cyclopentadienes and DCPD substituted with a $C_1$ to $C_{40}$ linear, branched, or cyclic alkyl group, preferably one or more methyl groups. Preferably, the cyclic components are selected from the group consisting of: cyclopentadiene, cyclopentadiene dimer, cyclopentadiene trimer, cyclopentadiene-$C_5$ co-dimer, cyclopentadiene-piperylene co-dimer, cyclopentadiene-$C_4$ co-dimer, cyclopentadiene-methyl cyclopentadiene co-dimer, methyl cyclopentadiene, methyl cyclopentadiene dimer, and mixtures thereof.

Preferably, the polymer backbone has a refractive index greater than 1.5. Preferably, the polymer backbone has a softening point of 80° C. or more (Ring and Ball, as measured by ASTM E-28) more preferably from 80° C. to 150° C., most preferably 100° C. to 150° C.

Preferably, the polymer backbone has a glass transition temperature (Tg) (as measured by ASTM E 1356 using a TA Instruments model 2920 machine) of from −30° C. to 100° C.

Preferably, the polymer backbone has a Brookfield Viscosity (ASTM D-3236) measured at the stated temperature (typically from 120° C. to 190° C.) using a Brookfield Thermosel viscometer and a number 27 spindle of 50 to 25,000 mPa·s at 177° C.

Preferably, the polymer backbone comprises olefinic unsaturation, e.g., at least 1 mol % olefinic hydrogen, based on the total moles of hydrogen in the interpolymer as determined by $^1$H-NMR. Alternatively, the polymer backbone comprises from 1 to 20 mol % aromatic hydrogen, preferably from 2 to 15 mol % aromatic hydrogen, more preferably from 2 to 10 mol % aromatic hydrogen, preferably at least 8 mol % aromatic hydrogen, based on the total moles of hydrogen in the polymer.

Preferably, the polymer backbone comprises a DCPD polymer described in International Patent Publication No. WO 2012/050658 A1.

Examples of polymer backbones useful in this invention include Escorez® 8000 series resins sold by ExxonMobil Chemical Company in Baton Rouge, La. Further examples of polymer backbones useful in this invention include Arkon® series resins sold by Arakawa Europe in Germany. Yet more examples of polymer backbones useful in this invention include the Eastotac® series of resins sold by Eastman Chemical Company in Longview, Tex.

Hydrosilylation Agents

As used herein the term "hydrosilylation agent" refers to a compound (cyclic or non-cyclic) having a Si—H bond that can catalytically react with the polymer backbone to yield a functionalized resin.

Suitable hydrosilylation agents include those represented by the formula (I):

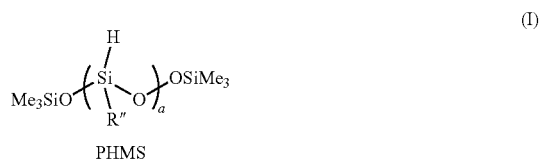

PHMS that have one or more reactive hydrogen atoms that can react with an olefinic group, where "a" is an integer from 1 to about 1000, and R" is an alkyl or an aryl group, including but not limited to methyl, hexyl, phenyl, fluoroalkanes, or other copolymers containing polymethylhydrosiloxane (PHMS) units substituted through the polymeric backbone, and combinations thereof. Preferably R" is $CH_3$.

Cyclic versions of hydrosilylation agents are also included and can be represented by the formula (II):

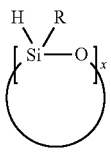

(II)

wherein x is from about 2 to about 40 SiO-groups/moieties, e.g. a siloxane chain; and R is an alkyl or an aryl group, including but not limited to methyl, ethyl, propyl, pentyl, phenyl, anthracenyl, and combinations thereof.

Non-cyclic versions of hydrosilylation agents are also included and can be represented by either of the chemical structures of the formulae (III):

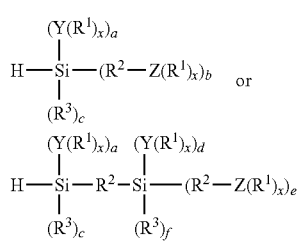

(III)

where Y is independently a nitrogen, oxygen, or sulfur atom, Z is independently a boron, nitrogen, oxygen, silicon or sulfur atom, $R_1$ is independently a hydrogen atom, or a substituted or unsubstituted alkyl or aromatic group of from 1 to 20 carbon atoms, $R^2$ is independently a divalent substituted or unsubstituted alkyl or aromatic group of from 1 to 20 carbon atoms, $R^3$ is independently a hydrogen atom, a halogen atom, a sulfonate group, a substituted or unsubstituted alkyl or aromatic group of from 1 to 20 carbon atoms, $R^1$, $R^2$, and $R^3$ may form single or multinuclear rings with each other, a-f are independently integers of 1, 2, or 3, with the proviso that a+b+c and d+e+f are both equal to 3, and independently for each Y and Z, if Z is a boron atom, then x=2, if Y or Z is a nitrogen atom, then x=2, if Y or Z is an oxygen atom or sulfur atom, then x=1, if Z is a silicon atom, then x=3

Catalysts

Useful catalysts include platinum (Pt) based materials having 0.1 to 10 wt % Pt-containing complexes in a suitable solvent. The actual amount in the reaction mixture is about 1-100 ppm or more of chloroplatinic acid, $H_2PtCl_6$ and derivatives such as with tetramethyldisiloxane or other versions of Speirs catalyst, $RhCl(PPh_3)_3$, heterocarbene containing Pt complexes such as those found in Journal of Organometallic Chemistry 696, (2011) 2918, or supported/reclaimable catalysts such as Pt-nanoclusters (Macromolecules 2006, 39, 2010-2012). Karstedt catalyst (typically a compound of platinum(0) and divinyltetramethyldisiloxane) is one example of a suitable platinum catalyst. Organic peroxides can be used to further crosslink functionalized PMHS with other vinyl terminated compounds.

Functionalization Process Followed by Silica-Treating

The reactants are typically combined in a reaction vessel at a temperature of 20° C. to 200° C. (preferably 50° C. to 160° C., preferably 60° C. to 140° C.) and a pressure of 0 to 1000 MPa (preferably 0.5 to 500 MPa, preferably 1 to 250 MPa) for a residence time of 0.5 seconds to 10 hours (preferably 1 second to 5 hours, preferably 1 minute to 1 hour).

Preferably, within the range from 0.00001 to 1.0 moles, more preferably 0.0001 to 0.05 moles, most preferably 0.0005 to 0.01 moles of catalyst are charged to the reactor per mole of polymer charged.

Preferably, within the range from 0.01 to 10 moles of a hydrosilylation agent, more preferably 0.05 to 5.0 moles, most preferably from 0.5 to 2.0 moles of a hydrosilylation agent are charged to the reactor per mole of polymer charged.

The process to prepare the polymer backbone is preferably a solution process, although it may be a bulk or high pressure process. Homogeneous processes are preferred. (A homogeneous process is defined to be a process where at least 90 wt % of the product is soluble in the reaction media.) A bulk homogeneous process is particularly preferred. (A bulk process is defined to be a process where reactant concentration in all feeds to the reactor is 70 vol % or more.) Alternately, no solvent or diluent is present or added in the reaction medium, (except for the small amounts used as the carrier for the catalyst or other additives, or amounts typically found with the reactants, e.g., propane in propylene).

Suitable diluents/solvents for the process to prepare the polymer backbone include non-coordinating, inert liquids. Examples include straight and branched-chain hydrocarbons, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof such as can be found commercially (Isopar™); perhalogenated hydrocarbons, such as perfluorinated $C_4$ to $C_{10}$ alkanes, chlorobenzene, and aromatic and alkyl-substituted aromatic compounds such as benzene, toluene, mesitylene, and xylene. In a preferred embodiment, aliphatic hydrocarbon solvents are preferred, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof. In another embodiment, the solvent is not aromatic, preferably aromatics are present in the solvent at less than 1 wt %, preferably at 0.5 wt %, preferably at 0 wt % based upon the weight of the solvents.

Alternatively, the process to prepare the polymer backbone is a slurry process. As used herein the term "slurry polymerization process" means a polymerization process where a supported catalyst is employed and monomers are polymerized on the supported catalyst particles. At least 95 wt % of polymer products derived from the supported catalyst are in granular form as solid particles (not dissolved in the diluent).

Preferably, the feed concentration for the process to prepare the polymer backbone is 60 vol % solvent or less, more preferably 40 vol % or less, most preferably 20 vol % or less.

The process may be batch, semi-batch or continuous. As used herein, the term continuous means a system that operates without interruption or cessation. For example, a continuous process to produce a polymer would be one where the reactants are continually introduced into one or more reactors and polymer product is continually withdrawn.

Useful reaction vessels include reactors (including continuous stirred tank reactors, batch reactors, reactive extruder, pipe or pump).

Preferably, the productivity of the functionalization process is at least 200 g of functionalized polymer per mmol of catalyst per hour, preferably at least 5,000 g/mmol/hour, preferably at least 10,000 g/mmol/hr, preferably at least 300,000 g/mmol/hr.

This invention further relates to a process, preferably an in-line process, preferably a continuous process, to produce functionalized polymers, comprising introducing one or more monomers into a reactor to polymerize, obtaining a reactor effluent containing polymers, optionally removing (such as flashing off) solvent, unused monomer and/or other volatiles, obtaining polymers, introducing polymers, a hydrosilylation agent and a catalyst into a reaction zone (such as a reactor, an extruder, a pipe and/or a pump), obtaining a reactor effluent containing functionalized polymers, optionally removing (such as flashing off) solvent, unused monomer and/or other volatiles, (such as those described herein), and obtaining functionalized polymers (such as those described herein).

Hydrosilylation products prepared herein can further be hydrogenated after completion or during reaction conditions.

The hydrogenation may be achieved in the presence of any of the known catalysts commonly used for hydrogenating petroleum resins. The catalysts which may be used in the hydrogenation step include the Group 10 metals such as nickel, palladium, ruthenium, rhodium, cobalt, and platinum, and the Group 6 metals such as tungsten, chromium and molybdenum, and the Group 11 metals such as rhenium, manganese, and copper. These metals may be used singularly or in a combination of two or more metals, in the metallic form or in an activated form, and may be used directly or carried on a solid support such as alumina or silica-alumina. A preferred catalyst is one comprising sulfided nickel-tungsten on a gamma-alumina support having a fresh catalyst surface area ranging from 120 to 300 $m^2$/g and containing from 2% to 10% by weight nickel and from 10% to 25% by weight tungsten as described in U.S. Pat. No. 4,629,766. The hydrogenation is carried out with a hydrogen pressure of 20-300 atmospheres, preferably 150-250 atmospheres.

While the functionalized resins used in the examples in the present invention are prepared via the hydrosilylation process, in an embodiment of the invention the resins can be prepared via free radical chemistry and/or metathesis chemistry known in the art as well.

Silica is then added to the functionalized resin composition. As used herein, the term "silica" is meant to refer to any type or particle size silica or another silicic acid derivative, or silicic acid, processed by solution, pyrogenic, or the like methods, including untreated, precipitated silica, crystalline silica, colloidal silica, aluminum or calcium silicates, fumed silica, and the like. Precipitated silica can be conventional silica, semi-highly dispersible silica, or highly dispersible silica. Preferably, the silica used to treat the functionalized resin composition is present within the range of from 5 to 50 phr, such that the ratio of the wt % of functionalized resin composition to silica used for pre-treating is 1:3.

High Performance Tire Tread Compositions

The functionalized polymer produced by this invention can be used in a high performance tire tread composition.

The high performance tire tread composition is formed by blending the silica treated functionalized polymer produced by this invention with diene elastomer and inorganic filler. Preferably, the silica treated functionalized polymer is present within the range from 5 to 100 phr, more preferably 10 to 50 phr. The diene elastomer may comprise a blend of two or more elastomers. The individual elastomer components may be present in various conventional amounts, with the total diene elastomer content in the tire tread composition being expressed as 100 phr in the formulation. Preferably, the inorganic filler is present within the range from 50 to 150 phr, more preferably 50 to 100 phr, most preferably 60 to 90 phr.

Diene Elastomer

As used herein, the term "diene elastomer" is meant to refer to any viscoelastic polymer synthesized from hydrocarbon monomer comprising two carbon double bonds.

Examples of preferred diene elastomers include, but are not limited to, natural rubber, polybutadiene rubber, polyisoprene rubber, styrene-butadiene rubber, isoprene-butadiene rubber, high cis-polybutadiene, ethylene-propylene rubber, ethylene-propylene-diene rubber, nitrile rubber, butyl rubber, halogenated butyl rubber, branched ("star-branched") butyl rubber, halogenated star-branched butyl rubber, poly(isobutylene-co-p-methylstyrene), brominated butyl rubber, chlorinated butyl rubber, star-branched polyisobutylene rubber, and mixtures thereof. Blends of these diene elastomers may be reactor blends and/or melt mixes. Particularly preferred diene elastomers include polybutadiene rubber and styrene-butadiene rubber. Preferably, the styrene-butadiene rubber has a styrene content of 25 wt %. The styrene-butadiene rubber used in the examples of the present invention is commercially available by Lanxess under the trade name Buna™ VSL 5025-2.

Inorganic Filler

The term "filler" as used herein refers to any material that is used to reinforce or modify physical properties, impart certain processing properties, or reduce cost of an elastomeric composition.

Examples of fillers suitable for the present invention include, but are not limited to, calcium carbonate, clay, mica, silica, silicates, talc, titanium dioxide, alumina, zinc oxide, starch, wood flour, carbon black, or mixtures thereof. The fillers may be any size and typically range, for example in the tire industry, from 0.0001 µm to 100 µm.

As used herein, the term "silica" is meant to refer to any type or particle size silica or another silicic acid derivative, or silicic acid, processed by solution, pyrogenic, or the like methods, including untreated, precipitated silica, crystalline silica, colloidal silica, aluminum or calcium silicates, fumed silica, and the like. Precipitated silica can be conventional silica, semi-highly dispersible silica, or highly dispersible silica. A preferred filler is commercially available by Rhodia Company under the trade name Zeosil™ Z1165.

Coupling Agent

As used herein, the term "coupling agent" is meant to refer to any agent capable of facilitating stable chemical and/or physical interaction between two otherwise non-interacting species, e.g., between a filler and a diene elastomer. Coupling agents cause silica to have a reinforcing effect on the rubber. Such coupling agents may be premixed, or pre-reacted, with the silica particles or added to the rubber mix during the rubber/silica processing, or mixing, stage. If the coupling agent and silica are added separately to the rubber mix during the rubber/silica mixing, or processing stage, it is considered that the coupling agent then combines in situ with the silica.

The coupling agent may be a sulfur-based coupling agent, an organic peroxide-based coupling agent, an inorganic coupling agent, a polyamine coupling agent, a resin coupling agent, a sulfur compound-based coupling agent, oxime-nitrosamine-based coupling agent, and sulfur. Among these, preferred for a rubber composition for tires is the sulfur-based coupling agent.

In an embodiment, the coupling agent is at least bifunctional. Non-limiting examples of bifunctional coupling agents include organosilanes or polyorganosiloxanes. Other examples of suitable coupling agents include silane polysulfides, referred to as "symmetrical" or "unsymmetrical" depending on their specific structure. Silane polysulphides can be described by the formula (IV);

in which x is an integer from 2 to 8 (preferably from 2 to 5); the A symbols, which are identical or different, represent a divalent hydrocarbon radical (preferably a $C_1$-$C_{18}$ alkylene group or a $C_6$-$C_{12}$ arylene group, more particularly a $C_1$-$C_{10}$, in particular $C_1$-$C_4$, alkylene, especially propylene); the Z symbols, which are identical or different, correspond to one of the three formulae (V)

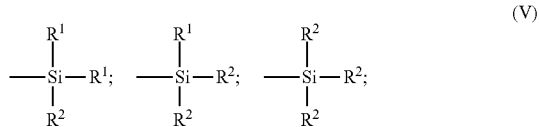

in which the $R^1$ radicals, which are substituted or unsubstituted and identical to or different from one another, represent a $C_1$-$C_{18}$ alkyl, $C_5$-$C_{18}$ cycloalkyl or $C_6$-$C_{18}$ aryl group (preferably $C_1$-$C_6$ alkyl, cyclohexyl or phenyl groups, in particular $C_1$-$C_4$ alkyl groups, more particularly methyl and/or ethyl); the $R^2$ radicals, which are substituted or unsubstituted and identical to or different from one another, represent a $C_1$-$C_{18}$ alkoxyl or $C_5$-$C_{18}$ cycloalkoxyl group (preferably a group selected from $C_1$-$C_8$ alkoxyls and $C_5$-$C_8$ cycloalkoxyls, more preferably still a group selected from $C_1$-$C_4$ alkoxyls, in particular methoxyl and ethoxyl). In the case of a mixture of alkoxysilane polysulphides corresponding to the above formula (I), in particular normal commercially available mixtures, the mean value of the "x" indices is a fractional number preferably of between 2 and 5, more preferably of approximately 4. However, the invention can also advantageously be carried out, for example, with alkoxysilane disulphides (x=2).

International Patent Publication Nos. WO 03/002648 and WO 03/002649 further disclose silane polysulfides. Non-limiting examples of silane polysulphides include bis(($C_1$-$C_4$)alkoxy($C_1$-$C_4$)alkylsilyl($C_1$-$C_4$)alkyl)polysulphides (in particular disulphides, trisulphides or tetrasulphides), such as, for example, bis(3-trimethoxysilylpropyl) or bis(3-triethoxysilylpropyl)polysulphides. Further examples include bis(3-triethoxysilylpropyl)tetrasulphide, abbreviated to TESPT, of formula $[(C_2H_5O)_3Si(CH_2)_3S_2]_2$, or bis(triethoxysilylpropyl)disulphide, abbreviated to TESPD, of formula $[(C_2H_5O)_3Si(CH_2)_3S]_2$. Other examples include, bis(mono ($C_1$-$C_4$)alkoxyldi($C_1$-$C_4$)alkylsilylpropyl)polysulphides (in particular disulphides, trisulphides or tetrasulphides), more particularly bis(monoethoxydimethylsilylpropyl)tetrasulphide, such as described in International Patent Publication No. WO 02/083782.

The coupling agent can also be bifunctional POSs (polyorganosiloxanes, or hydroxysilane polysulphides, as described in International Patent Publication Nos. WO 02/30939, WO 02/31041 and WO 2007/061550, or silanes or POSs bearing azodicarbonyl functional groups, as described in International Patent Publication Nos. WO 2006/125532, WO 2006/125533 and WO 2006/125534. The coupling agent can also include other silane sulphides, for example, silanes having at least one thiol (—SH) functional group (referred to as mercaptosilanes) and/or at least one masked thiol functional group, as described in U.S. Pat. No. 6,849,754, and International Patent Publication Nos. WO 99/09036, WO 2006/023815, WO 2007/098080, WO 2008/055986 and WO 2010/072685.

The coupling agent can also include combinations of one or more coupling agents described herein, as further described in Application WO 2006/125534. A preferred coupling agent comprises alkoxysilane or polysulphurized alkoxysilane. A particularly preferred polysulphurized alkoxysilane is bis(triethoxysilylpropyl) tetrasulphide, which is commercially available by Degussa under the trade name X50S.

Plasticizer

As used herein, the term "plasticizer" (also referred to as a processing oil), refers to a petroleum derived processing oil and synthetic plasticizer. Such oils are primarily used to improve the processability of the composition. Suitable plasticizers include, but are not limited to, aliphatic acid esters or hydrocarbon plasticizer oils such as paraffinic oils, aromatic oils, naphthenic petroleum oils, and polybutene oils. A particularly preferred plasticizer is naphthenic oil, which is commercially available by Nynas under the trade name Nytex™ 4700.

Antioxidant

As used herein, the term "antioxidant" refers to a chemical that combats oxidative degradation. Suitable antioxidants include diphenyl-p-phenylenediamine and those disclosed in *The Vanderbilt Rubber Handbook* (1978), pages 344 to 346. A particularly preferred antioxidant is para-phenylenediamines, which is commercially available by Eastman under the trade name Santoflex™ 6PPD.

Crosslinking Agents, Curatives, Cure Packages, and Curing Processes

The elastomeric compositions and the articles made from those compositions are generally manufactured with the aid of at least one cure package, at least one curative, at least one crosslinking agent, and/or undergo a process to cure the elastomeric composition. As used herein, at least one curative package refers to any material or method capable of imparting cured properties to a rubber as is commonly understood in the industry. A preferred agent is sulfur.

Processing: Preparation of Tire Tread Composition

The inventive tire tread composition may be compounded (mixed) by any conventional means known to those skilled in the art. The mixing may occur in a single step or in multiple stages. For example, the ingredients are typically mixed in at least two stages, namely at least one non-productive stage followed by a productive mixing stage. The terms "non-productive" and "productive" mix stages are well known to those having skill in the rubber mixing art. The diene elastomers, silica-treated functionalized composition, additives (filler, plasticizer, coupling agent, antioxidant), are generally mixed in one or more non-productive mix stages. Most preferably, the diene elastomers and the silica-treated functionalized composition are mixed first at 110° C. to 130° C. for 30 seconds to 2 minutes, followed by addition of the filler and other additives, the combination of which is further mixed, most preferably at an increasing temperature up to 140° C. to 160° C. for 30 seconds to 3 or 4 minutes. Most desirably the filler is mixed in portions, most preferably one half, then the second half. The final curatives are typically mixed in the productive mix stage. In the productive mix stage, the mixing typically occurs at a temperature, or ultimate temperature, lower than the mix temperature(s) of the preceding nonproductive mix stage(s).

Extractability

Tire tread compositions formed from the silica treated functionalized resins of the present invention exhibit less susceptibility to extraction of un-crosslinked material, indicating improved longevity of the resin matrix.

Preferably, the percentage of un-crosslinked material extracted from the tire tread composition after exposure to cyclohexane for 24 hours is less than 40%, more preferably less than 20%, most preferably less than 10%.

Cure Properties

Cure properties were measured using MDR 2000 from Alpha Technologies, Inc. at 160° C. based on ASTM D-2084. "MH" and "ML" used herein refer to "maximum torque" and "minimum torque," respectively. "Delta Torque" used herein refers to the difference between MH and ML.

Dynamic Mechanical Properties

Tire tread compositions formed from the silica-treated functionalized resins of the present invention exhibit superior dynamic mechanical properties measured via dynamic mechanical analysis (DMA) at 100° C., 14% strain, and 5 Hz in accordance with ASTM D7605, indicating improved durability, traction, and handling.

Tan delta at 100° C. can be used as an indicator of tire grip and other enhanced performance characteristics under extreme use conditions.

EXAMPLES

The hydrosilylation catalyst used in Example 1 is Platinum(0)-1,3-divinyl-1,1,3,3-tetramethyldisiloxane, known in the industry as Karstedt's catalyst.

Example 1. (Preparation of DCPD-F)

The preparation of silica-treated silane-functionalized resins according to the present invention can be illustrated as follows:

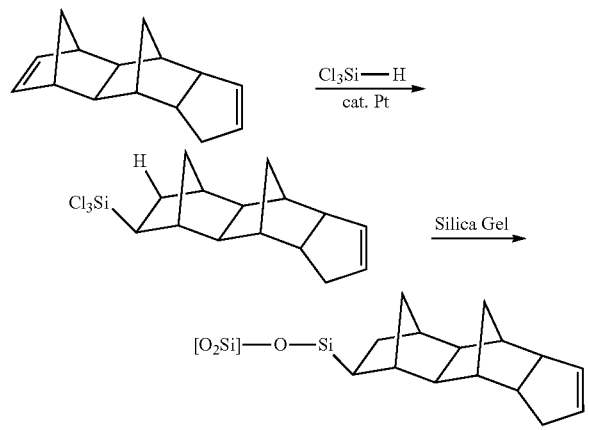

In a glove box a 250 mL round-bottomed flask was charged with a hydrocarbon resin (Escorez™ E8400 for C2 and E and Escorez™ 5400 for C1) (38.6 g), trichlorosilane (hydrosilylation agent) (38 mL), and a stirbar. A solution of Karstedt's catalyst in xylene (2 wt % Pt., 2.5 mL) was added. The solution was pressure sealed and heated to 60° C. for 5 days. Excess trichlorosilane was removed under reduced pressure and toluene (50 mL) was added and then removed under reduced pressure. Toluene (50 mL) was added again.

For inventive example E, the solution was added to a stirring mixture of silica gel (50 g) and toluene (250 mL) in a round-bottomed flask with a stirbar. For comparative examples C1-C2, no silica gel was added. The mixture was stirred for 72 hours at room temperature, and filtered, and the solids collected. As used herein, the term "room temperature" is used to refer to the temperature range of about 20° C. to about 23.5° C. The solid silica was placed in a vacuum oven at 70° C. until constant weight was achieved (72 g obtained).

Example 2. (Preparation of Tire Tread Compositions C1-C2 & E)

Comparative tire tread compositions C1-C2 and inventive tire tread composition E were obtained by first mixing 9 phr of the resin type shown in Table 1 with the ingredients listed in Table 2 (all amounts given in phr) in a Brabender™ mixer. All of the examples, C1-C2 and E, contain the same amount and type of elastomers, filler, coupling agent, oil, and antioxidant. Example E, unlike the comparative examples C1-C2, contains 37 phr of silica added during the first mixing cycle after the resin molecule is functionalized.

This first mix cycle was as follows: 1) mixer rotor speed was set at 25 RPM, temperature at 120° C.; 2) add polymers and mix for 30 seconds; 3) add half of the total amount of silica and mix for 30 seconds; 4) add the remainder of the silica and all other ingredients and increase rotor speed to reach 152° C.

TABLE 1

| | C1 | C2 | E |
|---|---|---|---|
| Resin Type | DCPD-H2 | DCPD-H2 | Si-DCPD-F |
| Trade Name | Escorez ™ 5400 | Escorez ™ 8400 | Escorez ™ 8400 |
| Silica Gel Treat | No | No | Yes |

TABLE 2

| Ingredient | Trade Name | C1 | C2 | E |
|---|---|---|---|---|
| Styrene-butadiene rubber (Elastomer) | Buna ™ VSL 5025-2 | 70 | 70 | 70 |
| Silica (Filler) | Zeosil ™ Z1165 | 60 | 60 | 60 |
| Polybutadiene (Elastomer) | Taktene ™ 1203 | 30 | 30 | 30 |
| Polysulphurized alkoxysilane supported on carbon black (Coupling Agent) | Degussa X50S | 4.85 | 4.85 | 4.85 |
| Naphtlienie oil | Nytex ™ 4700 | 5 | 5 | 5 |
| Antioxidant | Santoflex ™ 6PPD | 2 | 2 | 2 |

The resulting compounds were cooled and then blended using the same a Brabender™ mixer with curatives in the amounts shown in Table 3 (all amounts given in phr). All of the examples, C1-C2 and E, contain the same cure package. This second pass was performed as follows: 1) mixer rotor speed was set at 35 RPM, temperature at 70° C.; 2) add compound from first pass and mix for 30 seconds; 3) add curatives and mix for six minutes and 30 seconds; and 4) remove batch for a total mixing time of seven minutes from the addition of the compound.

TABLE 3

|  | C1 | C2 | E |
|---|---|---|---|
| Stearic acid | 2.5 | 2.5 | 2.5 |
| Zinc oxide | 2.5 | 2.5 | 2.5 |
| Sulfur (crosslinking agent) | 1.4 | 1.4 | 1.4 |
| Santocure ™ CBS (rubber accelerator) | 1.7 | 1.7 | 1.7 |
| Perkacit ™ DPG (rubber accelerator) | 2 | 2 | 2 |

Example 3. (Cure Properties of C1-C2 & E)

The results of these cure and stress/strain measurements are summarized in Table 4.

TABLE 4

|  | C1 | C2 | E |
|---|---|---|---|
| ML (dNm) | 7.9 | 6.6 | 6.2 |
| MH (dNm) | 40.1 | 29.0 | 40.8 |
| Delta Torque (dNm) | 32.7 | 22.4 | 34.6 |

The inventive material E showed lower ML values comparative to the comparatives C1-C2, demonstrating improved silica dispersion. The inventive material E showed comparable MH values compared to the comparative C1. As Tables 5 and 6 indicate, the extractability of dynamic mechanical properties of E were improved as compared to those properties of C2.

Example 4. (Extractability of C1-C2 & E)

The extractability of un-crosslinked material (e.g., low molecular polymers, antioxidants, cure fragments, oils, waxes, resin) from compositions C1-C2 and E were determined by exposing each composition to a cyclohexane solvent for 24 hours and subsequently measuring the amount of free low molecular material leeched from the resin matrix. The results from an average of two extractability tests of the inventive and comparative tire tread compositions are summarized in Table 5. The extractability of E was lower than that of C1-C2, demonstrating improved longevity of the resin matrix.

TABLE 5

|  | C1 | C2 | E |
|---|---|---|---|
| Extractions (% of un-crosslinked material removed) | 13.4 | 12.1 | 9.9 |

Example 5. (Dynamic Mechanical Properties of C1-C2 & E)

The dynamic mechanical properties of the inventive and comparative materials, measured at 100° C., are summarized in Table 6.

TABLE 6

|  | C1 | C2 | E |
|---|---|---|---|
| G' at 14% (kPa) | 2348 | 1990 | 2573 |
| tan delta at 14% | 0.140 | 0.214 | 0.174 |

Inventive material E showed a larger G' at 14% and tan delta at 14%, demonstrating improved durability, traction, and handling over the comparative material C1. Inventive material E showed a larger G' at 14% and comparable tan delta at 14% over the comparative material C2.

INDUSTRIAL APPLICABILITY

The compositions of the invention may be extruded, compression molded, blow molded, injection molded, and laminated into various shaped articles including fibers, films, laminates, layers, industrial parts such as automotive parts, appliance housings, consumer products, packaging, and the like.

In particular, the compositions comprising the resin are useful in components for a variety of tire applications such as truck tires, bus tires, automobile tires, motorcycle tires, off-road tires, aircraft tires, and the like. Such tires can be built, shaped, molded, and cured by various methods which are known and will be readily apparent to those having skill in the art. The compositions may be fabricated into a component of a finished article for a tire. The component may be any tire component such as treads, sidewalls, chafer strips, tire gum layers, reinforcing cord coating materials, cushion layers, and the like. The composition may be particularly useful in a tire tread.

The compositions comprising the resin of the present invention are useful in a variety of applications, particularly tire curing bladders, inner tubes, air sleeves, hoses, belts such as conveyor belts or automotive belts, solid tires, footwear components, rollers for graphic arts applications, vibration isolation devices, pharmaceutical devices, adhesives, caulks, sealants, glazing compounds, protective coatings, air cushions, pneumatic springs, air bellows, accumulator bags, and various bladders for fluid retention and curing processes. They are also useful as plasticizers in rubber formulations; as components to compositions that are manufactured into stretch-wrap films; as dispersants for lubricants; and in potting and electrical cable filling and cable housing materials.

The compositions comprising the resin may also be useful in molded rubber parts and may find wide applications in automobile suspension bumpers, auto exhaust hangers, and body mounts. In yet other applications, compositions of the invention are also useful in medical applications such as pharmaceutical stoppers and closures and coatings for medical devices.

Certain embodiments and features have been described using a set of numerical upper limits and a set of numerical lower limits. It should be appreciated that ranges from any lower limit to any upper limit are contemplated unless otherwise indicated. Certain lower limits, upper limits, and ranges appear in one or more claims below. All numerical values are "about" or "approximately" the indicated value, and take into account experimental error and variations that would be expected by a person having ordinary skill in the art.

To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

The invention claimed is:

1. A process for the preparation of a silica-treated functionalized resin composition comprising the steps of:
  (A) reacting a polymer backbone with a hydrosilylation agent to produce a silane-functionalized resin composition,
    wherein the polymer backbone is selected from at least one of dicyclopentadiene (DCPD)-based polymer, a cyclopentadiene (CPD)-based polymer, a DCPD-styrene copolymer, a $C_5$ copolymer resin, a $C_5$-styrene copolymer resin, a terpene copolymer resin, a pinene copolymer resin, a $C_9$ copolymer resin, a $C_5/C_9$ copolymer resin, an alpha-methylstyrene copolymer resin, and combinations thereof;
    wherein the polymer backbone comprises:
    within the range from 60 to 100 wt % cyclic components;
      (i) less than or equal to 15 wt % components derived from piperylene;
      (ii) from 0.1 to 10 wt % components derived from amylene;
      (iii) less than or equal to 15 wt % components derived from isoprene;
      (iv) from 0.1 to 20 wt % components derived from styrene; and
      (v) from 5 to 15 wt % components derived from indene; and
  (B) mixing the silane-functionalized resin composition with silica to produce a silica-treated functionalized resin composition;
  wherein the hydrosilylation agent is selected from at least one of those represented by formulas (I), (II), or (III):

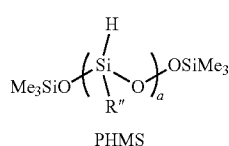

PHMS where "a" is an integer from 1 to about 1000, and R" is an alkyl or an aryl group;

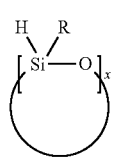

where x is from about 2 to about 40 SiO-groups/moieties, and R is an alkyl or an aryl group;

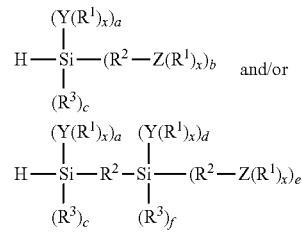

where Y is independently a nitrogen, oxygen, or sulfur atom, Z is independently a boron, nitrogen, oxygen, silicon or sulfur atom, $R^1$ is independently a hydrogen atom, or a substituted or unsubstituted alkyl or aromatic group of from 1 to 20 carbon atoms, $R^2$ is independently a divalent substituted or unsubstituted alkyl or aromatic group of from 1 to 20 carbon atoms, $R^3$ is independently a hydrogen atom, a halogen atom, a sulfonate group, a substituted or unsubstituted alkyl or aromatic group of from 1 to 20 carbon atoms, $R^1$, $R^2$, and $R^3$ may form single or multinuclear rings with each other, a-f are independently integers of 1, 2, or 3, with the proviso that a+b+c and d+e+f are both equal to 3, and independently for each Y and Z, if Z is a boron atom, then x=2, if Y or Z is a nitrogen atom, then x=2, if Y or Z is an oxygen atom or sulfur atom, then x=1, if Z is a silicon atom, then x=3.

2. The process of claim 1 wherein the ratio of the wt % of the silane-functionalized resin composition to the wt % of the silica is about 1:3.

3. The process of claim 1, wherein the hydrosilylation agent and the polymer backbone are contacted in the presence of a hydrosilylation catalyst to produce a catalyzed reaction product.

4. The process of claim 3, wherein the hydrosilylation agent and the polymer backbone are contacted in the presence of a metathesis catalyst, wherein the metathesis catalyst is a ruthenium catalyst.

5. A silica-treated functionalized resin composition of claim 1 prepared by the method of
  (A) reacting the polymer backbone with the hydrosilylation agent to produce a silane-functionalized resin composition; and
  (B) mixing the silane-functionalized resin composition with silica to produce a silica-treated functionalized resin composition.

6. The composition of claim 5, wherein the ratio of the wt % of the silane-functionalized resin composition to the wt % of the silica is about 1:3.

7. A tire tread composition comprising the silica-treated functionalized resin composition made by the process of claim 1.

8. The tire tread composition of claim 7, comprising:
  (i) the silica-treated functionalized resin composition within the range from 5 to 100 phr;
  (ii) 100 phr of a diene elastomer; and
  (iii) an inorganic filler within the range from 50 to 150 phr.

9. The tire tread composition of claim 8, wherein the silica-treated functionalized resin composition is present within the range from 20 to 50 phr.

10. The tire tread composition of claim 8, wherein the inorganic filler comprises silica.

11. The tire tread composition of claim 8, wherein the diene elastomer is selected from at least one of natural rubber, polybutadiene rubber, polyisoprene rubber, styrene-butadiene rubber, isoprene-butadiene rubber, high cis-polybutadiene, ethylene-propylene rubber, ethylene-propylene-diene rubber, nitrile rubber, butyl rubber, halogenated butyl rubber, branched ("star-branched") butyl rubber, halogenated star-branched butyl rubber, poly(isobutylene-co-p-methylstyrene), brominated butyl rubber, chlorinated butyl rubber, star-branched polyisobutylene rubber, and mixtures thereof.

12. The tire tread composition of claim 11, wherein the diene elastomer comprises a mixture of polybutadiene rubber and styrene-butadiene rubber.

13. The tire tread composition of claim 8, further comprising a coupling agent.

14. The tire tread composition of claim 8, wherein the composition is cured.

15. A tire comprising the tire tread composition of claim 8.

\* \* \* \* \*